Figure 1:
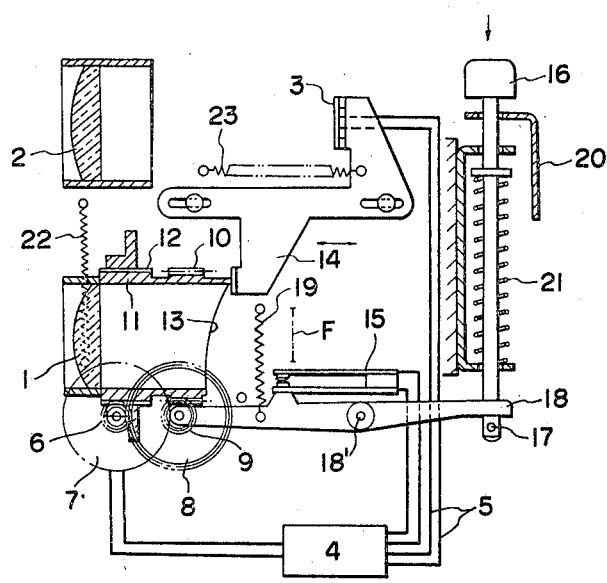

Nov. 25, 1969  TAKESHI GOSHIMA  3,479,943
AUTOMATIC FOCUSSING DEVICE FOR PHOTOGRAPHIC CAMERAS
Filed Nov. 25, 1963

INVENTOR.
TAKESHI GOSHIMA
BY
ATTORNEY

United States Patent Office

3,479,943
Patented Nov. 25, 1969

3,479,943
AUTOMATIC FOCUSSING DEVICE FOR PHOTOGRAPHIC CAMERAS
Takeshi Goshima, Ohta-ku, Tokyo, Japan, assignor to Canon Camera Company, Incorporated, Ohta-ku, Tokyo, Japan, a corporation of Japan
Filed Nov. 25, 1963, Ser. No. 325,829
Claims priority, application Japan, Nov. 27, 1962, 37/53,181
Int. Cl. G03b 3/00
U.S. Cl. 95—45                                    2 Claims The present invention relates to an automatic focussing device for photographic cameras that is interlocked in its action with the operation of the shutter release button.

The automatic focussing mechanism of this instant invention is based on the invention disclosed by Isao Yamaguchi and Tatsushi Kitanosono in pending application Ser. No. 238,935 filed Nov. 20, 1962, for "Focussing Device for Cameras Optical System."

The invention of said application may be summarized as follows: When an image is projected by a lens on a screen at the focal plane of the lens, there is noted a marked difference in the intensity of the illumination corresponding to a redistribution of the light rays on the screen as an image is brought from an unfocussed condition into the focussed picture even though the total luminous flux remains substantially unchanged throughout this procedure. In a photoconductive cell comprising a semiconductor body, for example, of a substance such as cadmium sulfide, arranged between two electrodes, the beam of light falling on the cell surface causes the electrical resistance of the semiconductive body, and therefore the magnitude of any electric current passing through the cell, to vary with the variation in the incident beam. The characteristic of the varying electrical resistance is related not merely to the total luminous flux incident upon the semiconductor but also the luminous intensity of the flux per unit area of light which relationship may be expressed by the equation $R=k/I^e$, where R designates the resistivity of the material of the semiconductor, I the luminous intensity, and $e$ and $k$ are constants specific to the semiconductive material.

The mechanism of the instant invention is of a type where a photoconductive element, of suitable electrical characteristic as above mentioned, is placed in the vicinity of the focal plane of the objective lens of the camera, or an equivalent focussing lens, and is arranged to move in the direction of the optical axis of and relatively with the objective lens, and, simultaneously the light rays incident on the photoconductive element are converted into electrical signals to control a driving means through a controller. By actuation of the driving means synchronously varies the spacing between the photoconductive element and the focussing lens, synchronously made to correspond to the spacing between the camera objective and the film surface at the focal plane. At the moment when an image is focussed on the surface of the photoconductive element, the electrical signals transmitted therefrom cease actuating the drive means. The magnitude of the electrical current generated by the photoconductive element during the variation of this distance changes as the distribution of the light intensity departs from uniformity reaching a maximum or minimum extreme value when precise focussing obtains. The automatic focussing device in accordance with the invention has the shutter release mechanism operatively interlocked with the automatic focussing mechanism, by which as above mentioned the focussing of the objective is performed by means of a suitable controller and a drive mechanism responsive to the electrical signal current generated by the photoconductive element displaceable in the vicinity of the focussing surface of the objective. The displacement of the photoconductive element relative to the objective lens results in the synchronous formation of images in focus both on the photoconductive surface and on the film surface. In the first stage of depressing a single shutter release button the automatic focussing action of the automatic focussing mechanism is initiated and completed while in the subsequent second stage of the depressed button the release of the camera shutter is effected. In the returning stage of the shutter release button, the spring biased release button restores these mechanisms to their preoperated status.

It is a main object of the invention to provide an automatic focussing device for various type photographic cameras that entirely automatically completes the focussing operation of the objective to form a focussed image on the film surface in response to depressing the shutter release button.

It is another object of the invention to provide an automatic focussing device for various type photographic cameras that automatically completes focussing the objective to form focussed images on the film surface in a first stage of shutter release operation and the actual release of the shutter in a subsequent second stage.

It is another object of the invention to provide an automatic focussing device that automatically completes the focussing operation of the objective to form focussed images on the film surface by electrical signals transmitted from a photoconductive element displaceable relative to the objective lens parallel to the optical axis of the lens.

It is another object of the invention to provide a compact automatic focussing device which is readily incorporated in various types of photographic cameras.

It is still another object of the invention to provide an automatic focussing device for photographic cameras that automatically restores, after completion of any single picture taking operation, to its initial state, ready for taking the next picture.

Figure 2:
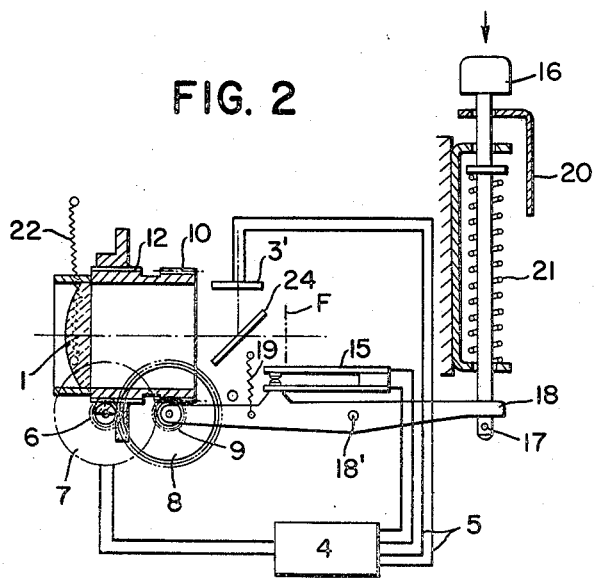

Other objects, advantages and features of this invention will become more apparent from the following description of illustrative embodiments when read in conjunction with the drawing, in which:

FIG. 1 is a schematic view of an illustrative embodiment of the automatic focussing device of the invention; and FIG. 2 is a schematic view of another illustrative embodiment of the automatic focussing device of the invention.

Now referring to the drawing, the objective is designated 1 and the focussing lens 2, the latter being movably along an optical axis on which is positioned a photoconductive element 3 of a compound such as cadmium sulphide (CdS). Corresponding to the distribution of light energy impinging on element 3 an electrical current flows through conductors 5 to controller 4, the output of which rotates a motor or other electromagnetic drive mechanism 7. The rotation of drive mechanism 7 is transferred, through reduction gearing 6 and 8, worm 9 and worm wheel 10, to lens tube 11, helicoidal threading 12 of which moves objective 1 in either direction with respect to film F. It will be noted here that the gearing of worm 9 and worm wheel 10 is designed in mesh such that it may transfer the rotation so effectively to the lens tube as to move the latter in either direction by the helicoidal threading thereon, and that photoconductive element 3 is simultaneously, and in the same orientation, moved in either direction with the objective lens tube 11, by being operatively interlocked therewith, either directly or indirectly. For example, the interlock may be by means of a lever cam 13 on objective lens tube 11 cam 13 cooperating with support 14 mounting photoconductive element 3; the camming value of cam 13 being selected such that the change in spacing between objective 1 and film surface F synchronously corresponds to the change in spacing between focussing lens 2 and photoconductive element 3. Furthermore, the interlocking means is so designed that when an image, produced by light rays passing through focussing lens 2, is formed in focus on photoconductive element 3, controller 4 ceases actuating electromagnetic drive mechanism 7, and at this instant the image formed by objective 1 lies in focus on film F. It is further to be noted that energizing switch 15 for controller 4, together with worm gearing 9 and 10, is operatively interlocked with the shutter release mechanism as to be described hereinafter.

FIGURE 1 schematically represents the condition where shutter button 16 has, on the first stage of its depression, released lever 18 from its position to which it has been rotated counterclockwise around fixed pin 18' and normally held against pin 17 in the rod of shutter button 16 when button 16 is not depressed. The released lever 18 is thereby rotated clockwise by the action of spring 19, closing switch 15 and engaging worm 9 with worm-wheel 10, to be ready to complete an automatic focussing operation in a set of sequential actions previously mentioned. After lapse of a period of time necessary for completion of the focussing action, the subsequent deeper depression of shutter button 16, as the second stage of the shutter release operation, actuates the unillustrated shutter mechanism by release lever 20 to complete a picture taking operation.

Release of the downward pressure on shutter button 16 thereupon permits its restoration to its initial position by spring 21, and lever 18 is rotated counterclockwise about pivot 18' by the restoring upward movement pin 17 on the shutter button rod against the action of spring 19, opening switch 15 and disengaging worm 9 from worm wheel 10. Simultaneously, lens tube 11 returns to its starting point of the objective under the tension of spring 22, stretched between a point on the surface of lens tube 11 and any selected fixed point, as does also photoconductive element 3 to its starting point by spring 23, stretched between a point on support 14 and any selected fixed point. Each of the positions for these two starting points may be selected that it corresponds to the distance of an object lying at infinity, or at the nearest point, or at a point midway between these points, with respect to the focussing distance of the objective. It is noted in addition that abandonment of the second stage of depression of shutter button 16 after the first stage which completes focussing, to discontinue further picture taking, restores all participant members of the mechanism to the initial state.

In the illustrative form of embodiment of the invention in FIGURE 1, obective 1 is shown separately mounted from focussing lens 2 only for convenience in illustration. It is possible otherwise to design the embodiment of the invention so that obective 1 alone is used, the focussing light rays being taken from those passing through the objective.

This type of embodiment is shown in FIG. 2. In FIG. 2, photoconductive element or transducer is designated as 3' and half mirror 24 is provided between objective 1 and film F. On element 3' is focussed an image corresponding the image focussed on film F. When the image is focussed on element 3'; drive motor 6 is stopped by the aid of controller 4, and at that time an image being focussed on film surface F by predetermining the relative positions of objective 1, half mirror 2 and element 3.

There may be a little time lag between the focussing on element 3' and stopping the rotation of motor. And for eliminating or correcting, if necessary, the error caused by this time lag, the distance from the reflecting surface of half mirror 2 to element 3' or film F may be deviated by a small amount.

It will be understood that this invention is not limited to the specific materials, figures, etc., and other details described above and illustrated in the drawing, but can be carried out with various modifications without departing from the scope of the invention, as defined in the appended claims.

What is claimed is:

1. An automatic focussing machanism for photographic camera comprising, a lens for directing the light incident thereon to focus at the focal plane thereof,
    unexposed photographic film being positionable at said focal plane,
a photoconductive element having the characteristic of $R = k/I^e$, where R designates its electrical resistivity, I the luminous intensity of the light incident thereupon, and $e$ and $k$ are constants specific to it,
a lens tube mounting the lens and movable along the optical axis of the lens,
an auxiliary lens for directing light incident thereupon along an axis parallel to that of the lens to the photoconductive element,
spring-biased means supporting the photoconductive element for motion in either direction along such parallel axis,
cam means on the lens tube for moving the photoconductive element supporting means in synchronism with, and in the same direction as, the lens tube movement,
electrical circuit means for moving the lens tube including the photoconductive element, a normally open switch, a controller, and a motor,
gearing interconnecting the lens tube and the motor,
a single spring-biased shutter release means for depressing to expose the film, and
spring-biased lever means associated with the switch and the shutter release means in such manner that in the initial portion of a depressing movement of the shutter release means the switch closes and electrical signals are transmitted from the controller selectively to rotate the motor and move the lens tube and the photoconductive element supporting means to position the element at the focal plane vicinity of the auxiliary lens and the lens so that its focal plane coincides with the position of the film, the motor stopping its rotation on the focussing of an image on the film, respectively, on the photoconductive element, and to stop rotation of the motor and movement of the lens tube and supporting means for the remaining portion of the depression of the shutter release means,
    the spring biased lever means on termination of the depression of the release means opening the switch and the spring-biased support means restore the element supporting means and the lens tubes to their respective preoperated positions.

2. An automatic focussing mechanism according to claim 1 in which the cam means is integral with the rear of the lens tube and acts against the front of the photoconductive element spring-biased supporting element, and the contour of the cam means is such that any change in the distance between the lens directing its incident light to the film and the film synchronously corresponds to the change in distance between the auxiliary lens and the photoconductive element.

References Cited

UNITED STATES PATENTS 2,999,436   9/1961  Faulhaber _____ 95—10
3,048,092   8/1962  Gottschalk _____ 95—45

JOHN M. HORAN, Primary Examiner